United States Patent [19]

Moore et al.

[11] Patent Number: 5,142,180
[45] Date of Patent: Aug. 25, 1992

[54] DIRECT CURRENT MOTOR FOR OPERATION AT ELEVATED TEMPERATURES IN A HOSTILE ENVIRONMENT

[75] Inventors: Boyd B. Moore; Moye Wicks, III, both of Houston, Tex.

[73] Assignee: Shell Oil Company

[21] Appl. No.: 598,564

[22] Filed: Oct. 19, 1990

Related U.S. Application Data

[63] Continuation of Ser. No. 413,146, Sep. 27, 1989, abandoned.

[51] Int. Cl.⁵ .................. H02K 1/06; H02K 1/22; H02K 5/12; H02K 21/12
[52] U.S. Cl. ........................ 310/261; 310/43; 310/156; 310/217; 310/87
[58] Field of Search .................. 310/86, 87, 88, 89, 310/216, 254, 258, 259, 43, 42, 156, 157, 166, 171, 177, 261, 265, 266, 267, 217

[56] References Cited

U.S. PATENT DOCUMENTS

| | | | |
|---|---|---|---|
| 2,080,678 | 5/1937 | Van Horn et al. | 310/258 |
| 2,303,893 | 12/1942 | Mullner | 310/156 |
| 2,727,164 | 12/1955 | Radice | 310/86 |
| 2,767,339 | 10/1956 | Hatfield | 310/261 |
| 2,831,992 | 4/1958 | Blackburn | 310/156 |
| 2,919,357 | 12/1959 | Lung | 310/42 |
| 3,082,338 | 3/1963 | Turk | 310/156 |
| 3,143,675 | 8/1964 | Hauenstein | 310/54 |
| 3,164,735 | 1/1965 | Lichowsky | 310/156 |
| 3,604,964 | 9/1971 | Conrad | 310/87 |
| 3,792,299 | 2/1974 | Hallerback | 310/258 |
| 3,881,243 | 5/1975 | Bannon | 310/156 |
| 3,953,752 | 4/1976 | Bannon | 310/156 |
| 3,983,435 | 9/1976 | Sims | 310/216 |
| 4,035,676 | 7/1977 | Adair | 310/156 |
| 4,035,677 | 7/1977 | Kusayama et al. | 310/156 |
| 4,206,379 | 6/1980 | Ouda | 310/156 |
| 4,392,073 | 7/1983 | Rosenberry, Jr. | 310/216 |
| 4,472,650 | 9/1984 | Advolotkin et al. | 310/156 |
| 4,487,299 | 12/1984 | Bookout | 310/87 |
| 4,641,422 | 2/1987 | Weaver | 310/156 |
| 4,644,202 | 2/1987 | Kroy et al. | 310/58 |
| 4,661,736 | 4/1987 | Kawada et al. | 310/156 |
| 4,984,745 | 1/1991 | Akeel et al. | 310/88 |

FOREIGN PATENT DOCUMENTS 12473934 10/1960 France .................. 310/156

Primary Examiner—Steven L. Stephan
Assistant Examiner—C. LaBalle

[57] ABSTRACT

A permanent magnet motor for operation at elevated temperatures wherein the magnets are clamped to the motor shaft by means of high temperature plastic bushings. The bushings have a coefficient of thermal expansion that exceeds the coefficient of thermal expansion of the motor shaft.

5 Claims, 1 Drawing Sheet

DIRECT CURRENT MOTOR FOR OPERATION AT ELEVATED TEMPERATURES IN A HOSTILE ENVIRONMENT

This is a continuation of application Ser. No. 413,146, filed Sep. 27, 1989 now abandoned.

BACKGROUND OF THE INVENTION

The present invention relates to brushless direct current electric motors and particularly to small electric motors that are used in various tools to make measurements in hostile environments at elevated temperatures. For example, in a copending application Ser. No. 516,589, filed Apr. 30, 1990, there is disclosed a tool which is adapted to make measurements in thermal injection wells. The term 'thermal injection wells' is used to refer to wells which are used to inject steam or other heated fluids into hydrocarbon-containing formations to reduce the viscosity of the hydrocarbon and increase the production. The injected fluids can be in the range of 300°-500° F. and contain caustic elements. Thus, measuring instruments disposed in a thermal injection wells must operate at elevated temperatures and in a hostile environment.

In the above referenced copending patent application, there is disclosed a tool designed to measure both the quality and quantity of steam being injected into particular locations in a thermal injection well. The tool utilizes a brushless direct current electric motor which is used both as a motor to drive elements of the tool and as a generator to measure current that is produced. The tool requires means for measuring the speed of the motor or the generator as well as the stall torque and current flow to the motor. This necessitates the use of direct current motors.

The prior art direct current motors available all rely upon wound armatures that require a commutator and brushes for their operation. The use of brushes can cause maintenance problems, produce unwanted electrical noise in the downhole measuring tool, and introduce large frictional drag limiting the low-end torque measurement. While permanent magnet direct current motors are known and would eliminate the need for brushes, none are available that will withstand the temperature conditions existing in thermal injection wells. One of the major problems with prior art direct current motors using permanent magnets for the rotor is the mounting of the magnets on the motor shaft so that they remain fixed in position at all times, even at elevated temperatures. Simple clamping means cannot be used since the clamps tend to distort the magnets and loosen at elevated temperatures. Various mechanical means have been used to fasten the permanent magnets onto the motor shaft. Mechanical means require machining of the magnets which distorts the magnetic field of the magnets. Use of solder or other bonding agents causes large stresses in the magnet which can lead to cracking, especially when coupled with thermal stresses on entering higher temperature environments.

SUMMARY OF THE INVENTION

The invention solves the above problems by providing a permanent magnet direct current motor in which the permanent rotor magnets are permanently affixed to the motor shaft. In particular, the motor utilizes cylindrical permanent magnets which have a plurality of pole faces formed on their outer surface. The cylindrical magnets are attached to the motor shaft by means of bushings which are pressed into each end of the cylindrical magnet. The bushings are sized so that they are an interference fit with the motor shaft and have a tapered surface formed on their outer diameter. Thus, the bushings can be forcibly inserted into the ends of the cylindrical magnets to clamp the magnet securely to the motor shaft.

The bushings are formed of a material which has a thermal coefficient of expansion that exceeds that of both the motor shaft and the cylindrical magnet. In addition, the material should be non-magnetic, capable of withstanding the elevated temperatures to which the motor is subjected, and of lower yield strength than the metal parts. A suitable material for the bushings is a polymer and in particular, an inorganic polymer of the polyimide class. This material has the ability to withstand elevated temperatures without degradation and its thermal coefficient of expansion exceeds all metallic materials and particularly ferromagnetic materials and noncorrosive metals which may be used for forming the motor shaft. The polyimide polymer is somewhat softer than the metal but retains sufficient strength to maintain its shape. The use of this polymer allows the motor to be assembled at normal room temperatures of 15° C. to 25° C. and cycled between low temperatures of −10° C. to 0° C. and temperatures above 100° C.

The remainder of the motor is designed so that it is of relatively small overall diameter and can be easily inserted into the housing of tools which are lowered into boreholes to make measurements. In addition, the motor is provided with suitable passageways so that a purge gas may be supplied to the motor to provide a differential pressure between the interior of the motor and the area surrounding the motor. This will ensure that the corrosive borehole fluids are excluded from the interior of the motor.

DESCRIPTION OF THE PREFERRED EMBODIMENT

Figure 1:
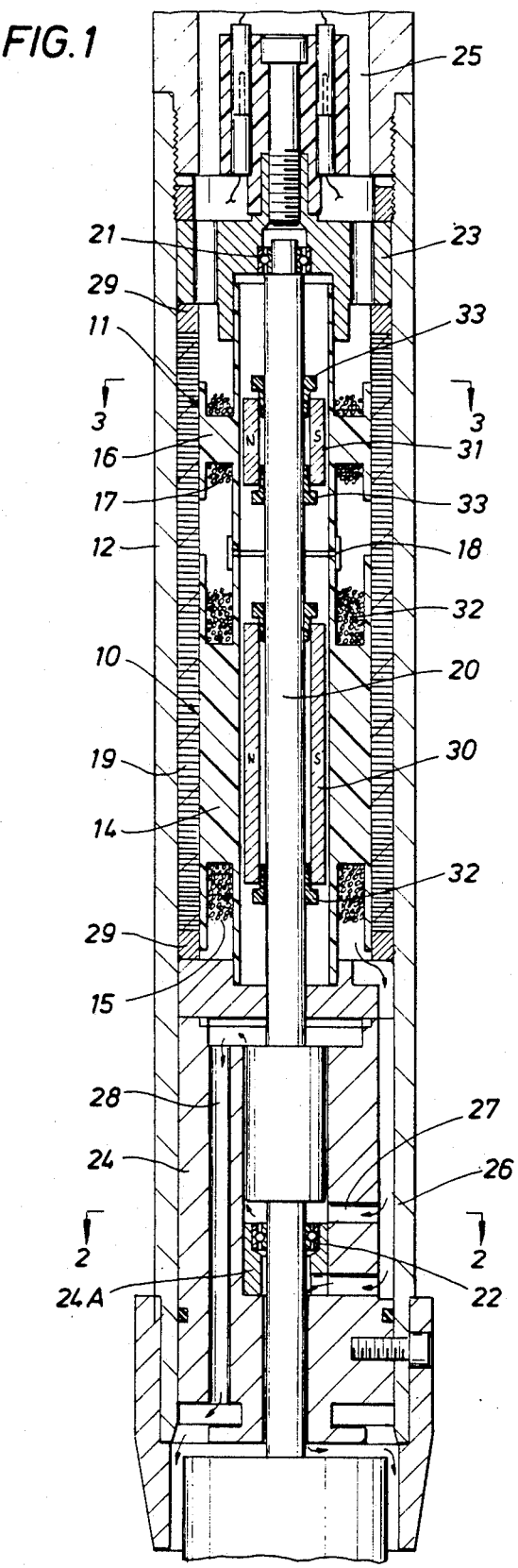
FIG. 1 is an elevation view of a motor constructed according to the invention shown in section.
Figure 5:
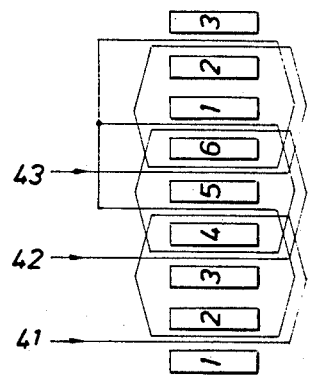
FIG. 5 is a wiring diagram of the stator of the motor.
Figure 2:
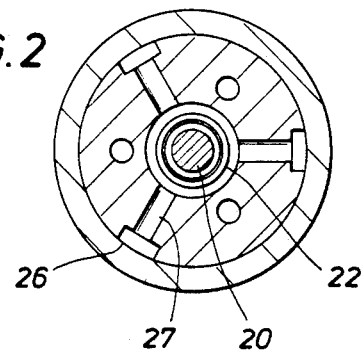
FIG. 2 is a cross section taken along the lines 2—2 of FIG. 1.

Referring now to the drawings, there is shown in FIG. 1 a motor 10 and a tachometer 11 which are disposed in the housing 12 of a tool designed for making measurements in a borehole. In particular, the tool may be of the type described in the above referenced copending application. The motor has a stator coil form 14 holding a stator winding 15 while the tachometer 11 has a similar stator coil form 16 holding a winding 17. Tachometer 11 has a shorter stator coil form than the motor 10 since it is used only for measuring rotational speed as described in the above copending application. As seen in FIG. 1, the stator is formed of two separate coil forms with three windings disposed on each as shown in FIG. 5. The two individual stator coil forms are coupled together by means of an insulating ring 18 to form a complete stator, yet magnetically separating the two individual stator coil forms. The two stators are provided with additional support by cylindrical laminations 19 which extend for the full length of the two stators to hold them in alignment concentric with the shaft. The primary purpose of the laminations is to control the magnetic field produced by the magnets, and thereby reduce eddy current drag. Additional rings 29 are placed at the end of the laminations 19 to secure them in position. The laminations are formed of high magnetic permeability material, such as Carpenter High Permeability "49" ® steel, about 0.006-inches thick. The rings 29 are all formed of non-magnetic material, preferably a polyimide, sold under the trade name of VESPEL®SP-1, by DuPont.

The motor shaft 20 is supported at one end by a ball bearing 21 and at the other end by ball bearing 22. The ball bearings are supported in suitable members 23 and 24A, respectively, with the members being mounted in the housing 12 of the tool. The bearing support 24A is formed from the polyimide VESPEL-SP-1 to allow for difference in the thermal expansion in the various materials. Both the bearing support members and the remaining portions of the housing are supplied with suitable passage means at 25, 26 and 27, with an outlet at 28, additional unnumbered passages are provided to supply purge gas to various portions of the device with the gas flow path being shown by the arrows on the drawings. The passage means provide a flow path for the purge gas which is used to pressurize the motor housing to exclude borehole fluids from the motor housing.

Figure 4:
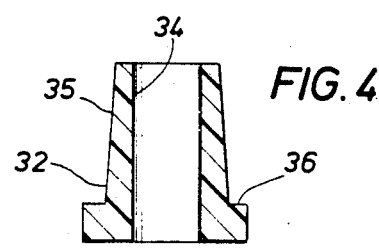
FIG. 4 is an elevation view shown in section of a bushing of the motor shown in FIG. 1 drawn to an enlarged scale.

The cylindrical magnets, preferably of samarium cobalt, 30 and 31 for the motor 10 and tachometer 11, respectively, are mounted on the motor shaft by means of bushings 32 and 33. As is best seen in FIG. 4, the bushings are provided with a central bore 34 which is a slight interference fit on the motor shaft. It has been found useful if this interference fit is within the range of 0.0002 to 0.0008 inches for a motor shaft of 0.1875 inches in diameter. The outer surface 35 of the bushing is provided with a slight taper that provides a wedging action when the bushings are forced into opposite ends of the cylindrical magnet. It has been found that a taper of one degree included angle provides sufficient wedging action to firmly anchor or clamp the cylindrical magnets to the motor shaft. The bushing is provided with a radially extending flange 36 which provides for ease of assembly.

As explained above, the bushings are formed of a non-magnetic material which has a larger thermal coefficient of expansion than either the motor shaft 20 or the cylindrical magnets 30 and 31. In addition, the material must be capable of withstanding the high temperatures to which the motors may be subjected without degradation. As is well known, most plastic non-magnetic materials release vapor and degrade when heated. It has been found that a polymer, and particularly a polymer from the polyimide class, is suitable for this purpose. A polymer sold under the tradename VESPEL®SP-1 by DuPont meets all of the above requirements. Bushings formed of this material are extremely advantageous since they do not degrade when subjected to temperatures up to 500° F. In addition, the material has a thermal coefficient of expansion greater than the metallic materials used in the motor. This allows the motor to be assembled at room temperatures and operated over a wide temperature range of −10° C. to above 100° C. without damage.

Figure 3:
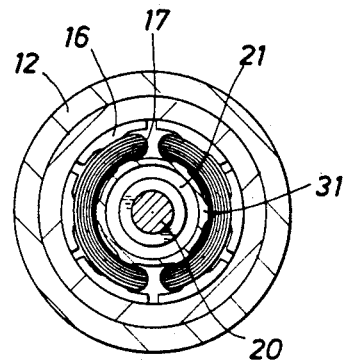
FIG. 3 is a cross section taken along the lines 3—3 of FIG. 1.

Referring to FIG. 5, it is seen that the three stator windings are connected in a Y configuration. The numbers 1-6 refer to the six individual poles shown in FIG. 3. The leads 41, 42 and 43 of the coils are connected to the power supply. The above referenced copending application uses a pulsed direct current power supply. The duration of the pulses and the delay between pulses are equal with the frequency of the pulses being varied to change the speed of the motor. The three individual series of pulses are spaced in time to provide a power supply having a three phase characteristic. The control of the rate of direct current pulses is much easier than controlling the frequency of a conventional three phase alternating current power supply.

From the above description, it can be seen that the invention provides a simple means by which permanent cylindrical magnets can be securely fastened to a motor shaft of a motor that is designed to operate over extremely high temperature differences and with low friction. In particular, the invention provides a means by which the permanent magnets can be anchored without putting undue stress on the magnets or otherwise distorting their magnetic field. The bushings which are forced or pressed into the end of the cylindrical magnet to hold it to the motor shaft are non-magnetic and do not require any threading or other machining of the magnets. Thus, the magnets can be uniform, cylindrical members and produce a uniform magnetic field. This would not be possible if mechanical fastening means requiring holes, threads, or other machining operations on the cylindrical magnets. Further, since the bushings have a higher thermal coefficient of expansion than either the magnets or the motor shaft, they obviously will firmly anchor the magnets to the shaft as the temperature of the motor is elevated. An additional feature of the invention is the use of plastic that does not degrade at elevated temperatures for forming the bushings, and thus, the bushings being of plastic, will not damage the surface of the magnets. The material dimension must be selected such that on cooling, excessive stress is avoided.

It is important that the magnetic field be uniform when the motor is used to make measurements as described in the copending application. Any distortion of the magnetic field would result in inaccurate measurements due to "cogging" effects on rotation. While non-uniform performance of a direct current motor is acceptable in many applications, it is unacceptable in this measuring instrument. The uniform performance is insured by the use of the pulsed direct current power supply described above. The pulsed direct current produces a more uniform magnetic field than conventional three phase alternating current.

What is claimed is:

1. A permanent magnet motor for operation at temperatures above 100° C., comprising:
    a stator having at least one winding;
    a motor shaft, said shaft being rotatably mounted for rotation within said stator;
    a cylindrical-shaped permanent magnet having at least a pair of poles, said magnet being disposed on said motor shaft;
    a pair of bushings, said bushings being disposed in the ends of said magnet to firmly clamp said magnet to said motor shaft, said bushings being formed of a material that has a larger coefficient of thermal expansion than either said magnet or said motor shaft;

a cylindrical lamination extending the length of the stator, the cylindrical lamination being functional to support and hold the stator in alignment concentric with the shaft and to control a magnetic field produced by the magnet; and a pair of rings located at opposite ends of cylindrical lamination, the rings being functional to secure the cylindrical lamination in position, said rings being formed of the same material as said bushings.

2. The motor of claim 1 wherein said bushings have a central bore that is an interference fit on said motor shaft and an over all diameter that is an interference fit in the ends of said magnet.

3. The motor of claim 1 wherein said bushings and said rings are formed of a high temperature polymer.

4. The motor of claim 3 wherein said high temperature polymer is a polyimide.

5. The motor of claim 1 including housing enclosing said motor, said housing facilitating use of the motor down-hole in an oil or gas well, and passages in said housing functional to provide a flow path for purge gas useful to pressurize the motor housing to exclude borehole fluids from the housing.

* * * * *